United States Patent [19]

Fujiwara

[11] Patent Number: 5,553,080
[45] Date of Patent: Sep. 3, 1996

[54] SPEECH DECODING APPARATUS COMPRISING ALARM SIGNAL GENERATOR OPERABLE ON DETERIORATION OF TRANSMISSION PATH QUALITY

[75] Inventor: Ryuhei Fujiwara, Tokyo, Japan

[73] Assignee: NEC Corporation, Tokyo, Japan

[21] Appl. No.: 381,274

[22] Filed: Jan. 31, 1995

Related U.S. Application Data

[63] Continuation-in-part of Ser. No. 105,953, Aug. 13, 1993, abandoned.

[30] Foreign Application Priority Data

Aug. 13, 1992 [JP] Japan ..................... 4-237811

[51] Int. Cl.[6] .................................................. G06F 11/00
[52] U.S. Cl. ..................... 371/5.1; 395/2; 368/3
[58] Field of Search ................. 371/5.1, 5.2, 25.1, 371/5.5; 381/36; 379/58; 368/63; 340/540; 395/2

[56] References Cited

U.S. PATENT DOCUMENTS

| 4,389,121 | 6/1983 | Hashimoto et al. | 368/63 |
| 4,551,029 | 11/1985 | Aizawa | 368/273 |
| 5,058,433 | 10/1991 | Wilson et al. | 73/651 |
| 5,109,401 | 4/1992 | Hattori et al. | 379/58 |
| 5,142,582 | 8/1992 | Asakawa et al. | 381/36 |
| 5,148,431 | 9/1992 | Hayashi | 371/5.1 |

Primary Examiner—Robert W. Beausoliel, Jr.
Assistant Examiner—My-Phung Chung
Attorney, Agent, or Firm—Sughrue, Mion, Zinn, Macpeak & Seas

[57] ABSTRACT

In a speech decoding apparatus (100) supplied with an input speech signal (101) comprising successive blocks, each comprising a digital speech signal and an error detecting code signal, an error detector (8) detects an error in the digital speech signal by the error detecting code signal for each block to produce error detection pulses whenever the error detector detects the error. The error detector also produces the digital speech signals of the blocks. A speech decoder (9) decodes the digital speech signals of the blocks into an analog speech signal. A measuring circuit (102) measures, as a measured value, the number of the error detection pulses during a predetermined time interval. A comparator (15) compares the measured value with a reference value to produce a command signal when the measured value is greater than the reference value. A generator (12) generates an alarm signal in response to the command signal.

14 Claims, 3 Drawing Sheets

SPEECH DECODING APPARATUS COMPRISING ALARM SIGNAL GENERATOR OPERABLE ON DETERIORATION OF TRANSMISSION PATH QUALITY

This is a Continuation-In-Part of application Ser. No. 08/105,953 filed Aug. 13, 1993 now abandoned.

BACKGROUND OF THE INVENTION

This invention relates to a speech decoding apparatus and, in particular, to a speech decoding apparatus for use in a radio telephone apparatus of a digital communication system.

A radio telephone apparatus of a digital communication system comprises a coding and decoding apparatus (CODEC) for interconversion between an analog speech signal and a digital speech signal. As a coding system adopted in the coding and decoding apparatus to convert the analog speech signal into the digital speech signal, use has generally been made of a PCM (pulse code modulation) system for coding Instantaneous voltages at sampling time instants, a ΔM (delta modulation) system for coding a difference between sampling time instants, or the like.

In the coding and decoding apparatus of the type described, a correlation exists between an error in a reception signal and a decoded waveform. In this connection, a user of the coding and decoding apparatus can audibly recognize deterioration of the quality of a transmission path in a proportional relationship. Accordingly, the user has an option to maintain or terminate communication in dependence upon the deterioration of the reception signal.

On the other hand, a coding and decoding apparatus of a novel type has recently been developed and put into practical use. For example, there is known a speech coding and decoding apparatus (SPEECH CODEC) in which speech information alone is transmitted and a characteristic component of a speech signal alone is coded in order to reduce a transmission rate in a radio channel area and to narrow a modulation bandwidth.

The speech coding and decoding apparatus is constructed in accordance with a standard "STANDARD 27A" established by RCR (Research & Development Center for Radio System) in Japan.

The speech coding and decoding apparatus has a high signal compression ratio. Accordingly, a speech reproduction characteristic after decoding is extremely deteriorated when a code error occurs in the transmission path. In this connection, when the speech coding and decoding apparatus is used, an error detection/correction code is added to an encoder output to assure the quality of the transmission path.

Generally, an error detection capability is greater than an error correction capability. Inasmuch as a signal error rate in the transmission path is within the correction capability, a decoder is supplied with a corrected signal. When the signal error rate is increased to exceed the correction capability, an error detection function alone is operable. In this event, false codes are discarded and are not supplied to the decoder. Alternatively, a decoded output signal is chuted so that no output is produced.

When the quality of the transmission path is deteriorated, the user of the speech coding and decoding apparatus can hear a normal speech sound before a certain level of deterioration is reached. Thereafter, a communication channel is abruptly interrupted (silent). This results in an embarrassment of the user.

SUMMARY OF THE INVENTION

It is an object of this invention to provide a speech decoding apparatus which is for use in a digital radio telephone set and which prevents a decoded speech output from being put into a silent state upon deterioration of the quality of a transmission path.

Other objects of this invention will become clear as the description proceeds.

A speech decoding apparatus to which this invention is applicable is supplied with an input speech signal comprising successive blocks, each comprising a digital speech signal and an error detecting code signal which succeeds the digital speech signal and is for use in detecting an error in the digital speech signal. The speech decoding apparatus decodes the digital speech signals of the successive blocks into an analog speech signal.

According to this invention, the speech decoding apparatus comprises: an error detector supplied with the input speech signal for detecting the error in the digital speech signal by the use of the error detecting code signal for each of the successive blocks to produce error detection pulses whenever the error detector detects the error, the error detector furthermore producing the digital speech signals of the successive blocks; a speech decoder connected to the error detector for decoding the digital speech signals of the successive blocks into the analog speech signal; a measuring circuit connected to the error detector for measuring, as a measured value, the number of the error detection pulses during a predetermined time interval; a comparator connected to the measuring circuit for comparing the measured value with a reference value to produce a command signal when the measured value is greater than the reference value; and an alarm signal generator connected to the comparator for generating an alarm signal when the comparator produces the command signal.

DESCRIPTION OF THE PREFERRED EMBODIMENT

Figure 1:
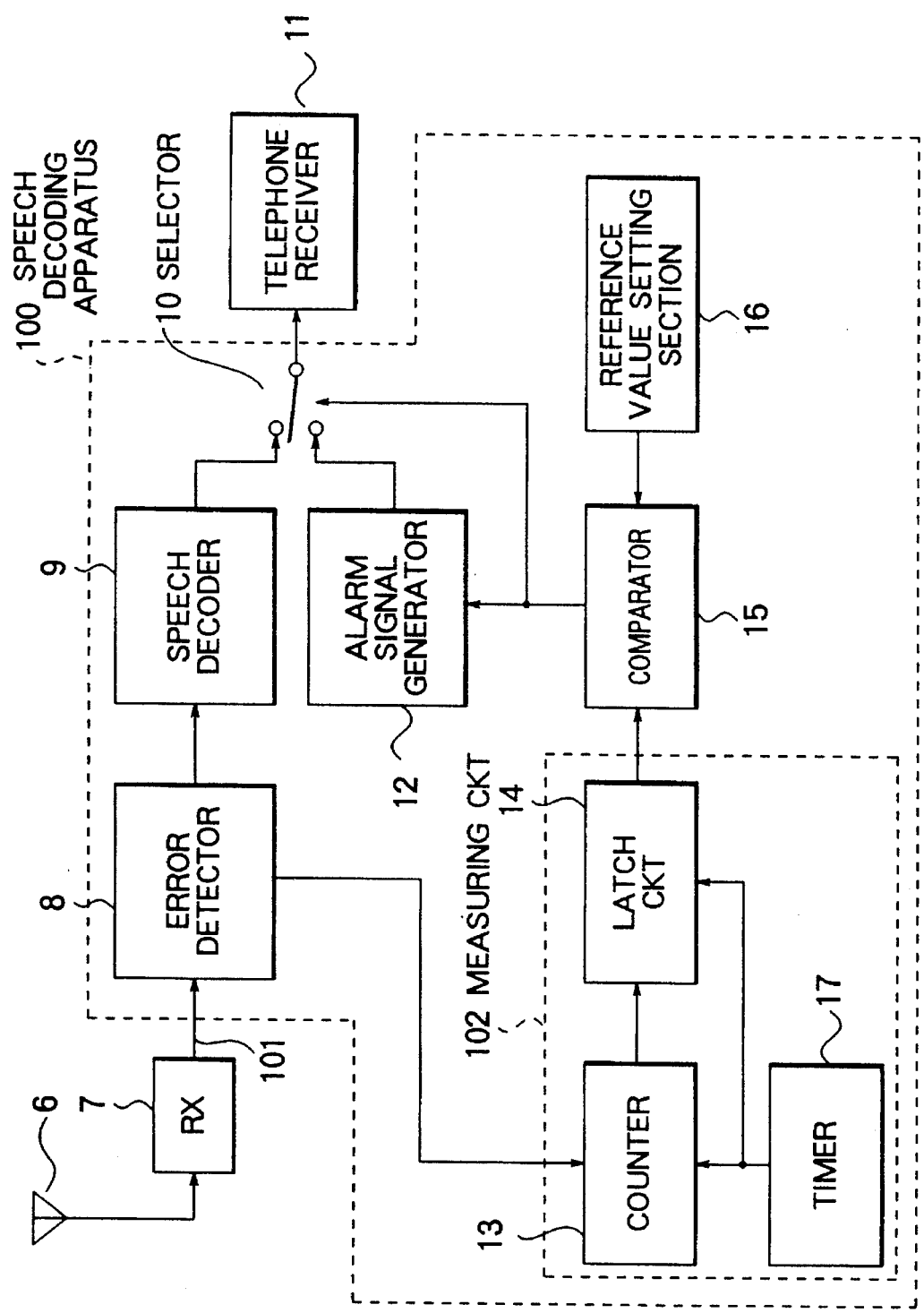
FIG. 1 is a block diagram of a radio telephone apparatus comprising a speech decoding apparatus according to a preferred embodiment of this invention.

Referring to FIG. 1, a speech decoding apparatus 100 according to an embodiment of this invention is included in a radio telephone apparatus. Description will first be made as regards the speech decoding apparatus 100. The speech decoding apparatus 100 is supplied with an input speech signal 101.

Figure 2:
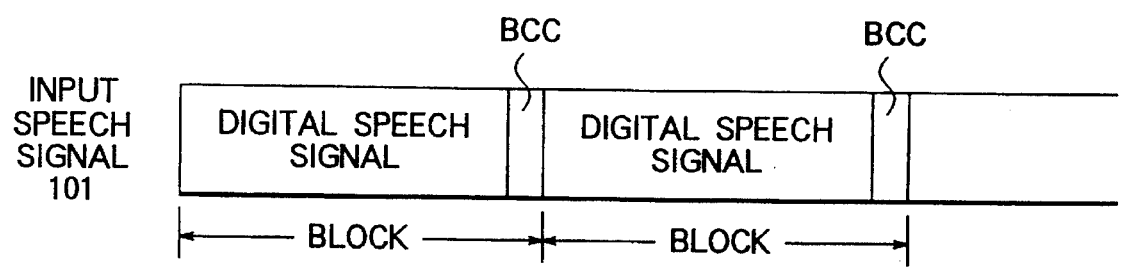
FIG. 2 is a signal format of an input speech signal for use in describing operation of the speech decoding apparatus of FIG. 1.

Turning to FIG. 2, the input speech signal 101 comprises successive blocks. Each of the successive blocks comprises a digital speech signal and an error detecting code signal representative of a block check character code labelled BCC. The error detecting code signal succeeds the digital speech signal and is for use in detecting an error in the digital speech signal.

Turning back to FIG. 1, the speech decoding apparatus 100 decodes the digital speech signals of the successive blocks into an analog speech signal. The speech decoding apparatus 100 comprises an error detector 8 supplied with the input speech signal 101. The error detector 8 detects the error in the digital speech signal 101 by the use of the error detecting code signal for each of the successive blocks and produces error detection pulses (namely, error flags of a high level) whenever the error detector 8 detects the error. The error detector 8 furthermore produces the digital speech signals of the successive blocks by removing the error detecting code signals from the input speech signal 101.

A speech decoder 9 is connected to the error detector 8. The speech decoder 9 decodes the digital speech signals of the successive blocks into the analog speech signal.

A measuring circuit 102 is connected to the error detector 8. The measuring circuit 102 measures, as a measured value, the number of the error detection pulses during a predetermined time interval in the manner which will later be described.

A comparator 15 is connected to the measuring circuit 102. The Comparator 15 compares the measured value with a reference value and produces a command signal representation of the measured value, when the measured value is greater than the reference value. The reference value is produced by a reference value setting section 16.

An alarm signal generator 12 is connected to the comparator 15. The alarm signal generator 12 generates an alarm signal when the comparator 15 produces the command signal. More specifically, the alarm signal generator 12 generates the alarm signal proportional to the measured value represented by the command signal. Hence, the frequency, the level, and/or the generation pattern of the alarm signal is varied in proportion to the measured value.

For example, if the measured value increases, the frequency, level and/or generation pattern of the alarm signal increases by an amount proportional to the increase in the measured value. Likewise, if the measured value decreases, the frequency, level and/or generation pattern of the alarm signal decreases by an amount proportional to the decrease in the measured value.

A selector (or switch) 10 is connected to the speech decoder 9 and the alarm signal generator 12. The selector 10 selects the analog speech signal as an apparatus output signal when the selector 10 is not supplied with the command signal from the comparator 15. When the selector 10 is supplied with the command signal from the comparator 15, the selector 10 selects the alarm signal as the apparatus output signal.

Figure 3:
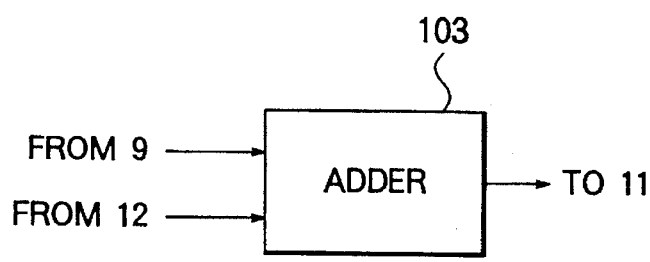
FIG. 3 is a block diagram of an adder which may be used instead of a selector of the speech decoding apparatus of FIG. 1.

Turning to FIG. 3, an adder or mixer 103 may be used instead of the selector 10. In this case, the adder 103 is connected to the speech decoder 9 and the alarm signal generator 12. The adder 103 produces the analog speech signal as the apparatus output signal when the adder 103 is not supplied with the alarm signal. When the adder 103 is supplied with the alarm signal, the adder 103 produces a sum signal representative of a sum of the analog speech signal and the alarm signal as the apparatus output signal. The adder 103 will further be described later.

Figure 4:
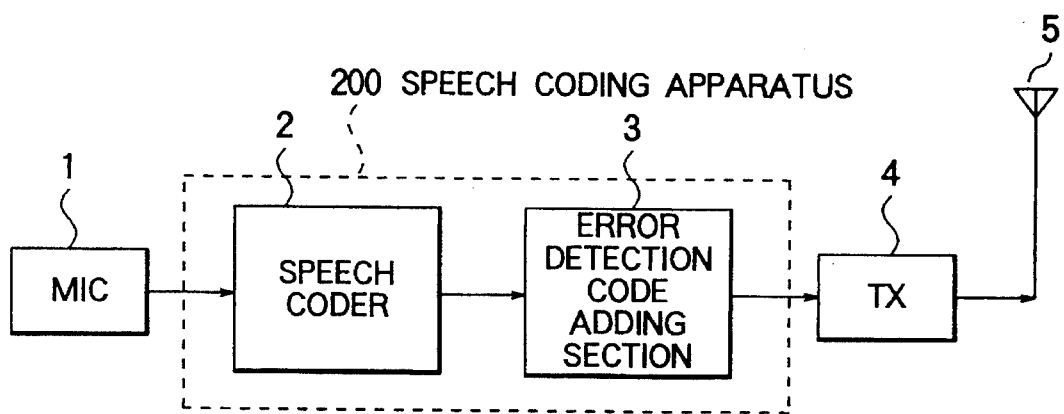
FIG. 4 is a block diagram of a radio telephone apparatus comprising a speech coding apparatus which may constitute a speech coding and decoding apparatus together with the speech decoding apparatus of FIG. 1.

Turning to FIG. 4, a speech coding apparatus 200 is also included in the radio telephone apparatus which comprises the speech coding apparatus 100 (FIG. 1). The speech coding apparatus 200 and the speech decoding apparatus 100 constitute a speech coding and decoding apparatus (SPEECH CODEC) although the speech coding apparatus 200 and the speech decoding apparatus 100 are separately illustrated in the figure. Description will now be made as regards the speech coding apparatus 200 of the radio telephone apparatus.

A microphone (MIC) 1 produces an analog speech signal corresponding to a human speech sound and supplies the analog speech signal to a speech coder 2. The speech coder 2 processes the analog speech signal into a digital speech signal.

Figure 5:
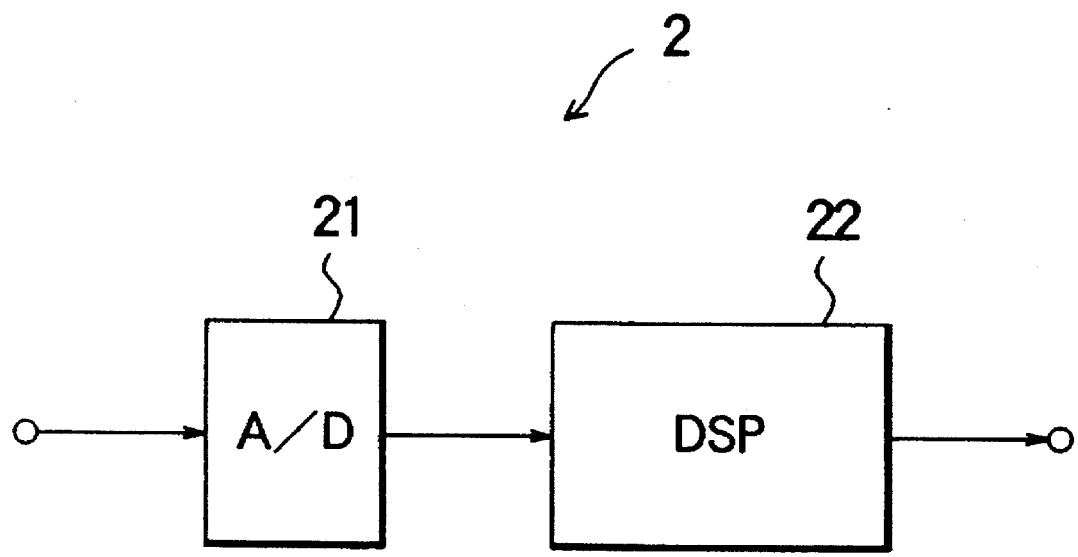
FIG. 5 is a block diagram of a speech decoder of the speech coding apparatus of FIG. 4.

Turning to FIG. 5, a specific example of the speech coder 2 is illustrated. The speech coder 2 comprises an analog-to-digital converter (A/D) 21 and a digital signal processor (DSP) 22.

Instantaneous voltages of the digital speech signal converted by the A/D converter 21 are successively sent to the DSP 22. The DSP 22 analyzes various characteristics, such as a frequency, of the speech sound. The result of analysis is produced as information data in the form of a digital signal code sequence.

An error detection code adding section 3 divides the digital speech signal supplied from the speech coder 2 into a plurality of units having a predetermined unit length. A block check character code (BCC) for error detection is added to each unit to form each block which corresponds to each block of the input speech signal 101 of FIG. 2. The digital speech signal with the block check character codes is transmitted by a transmitter (TX) 4 to be radiated through an antenna 5 as a radio wave, Turning back to FIG. 1 again, the radio wave is received through an antenna 6 and delivered to a receiver (RX) 7 to be demodulated. The error detector 8 is supplied with a reception demodulated output signal of the receiver 7 and the input speech signal 101. The input speech signal 101 may contain a signal error occurring in a transmission route from the transmitter 4 to the receiver 7 via the antenna 5, a transmission path (space), and the antenna 6. With reference to the block check character codes included in each block, the error detector 8 detects the presence of an error in each block. Upon detection of the presence of an error, the error flag of a high level is produced as the error detection pulse and delivered to the measuring circuit 102. Simultaneously, speech information data after the block check character code is removed is delivered to the speech decoder 9 to be reproduced as the analog speech signal. The analog speech signal is supplied through the selector (or the switch) 10 to a telephone receiver 11 and reaches a human ear as an acoustic wave.

Figure 6:
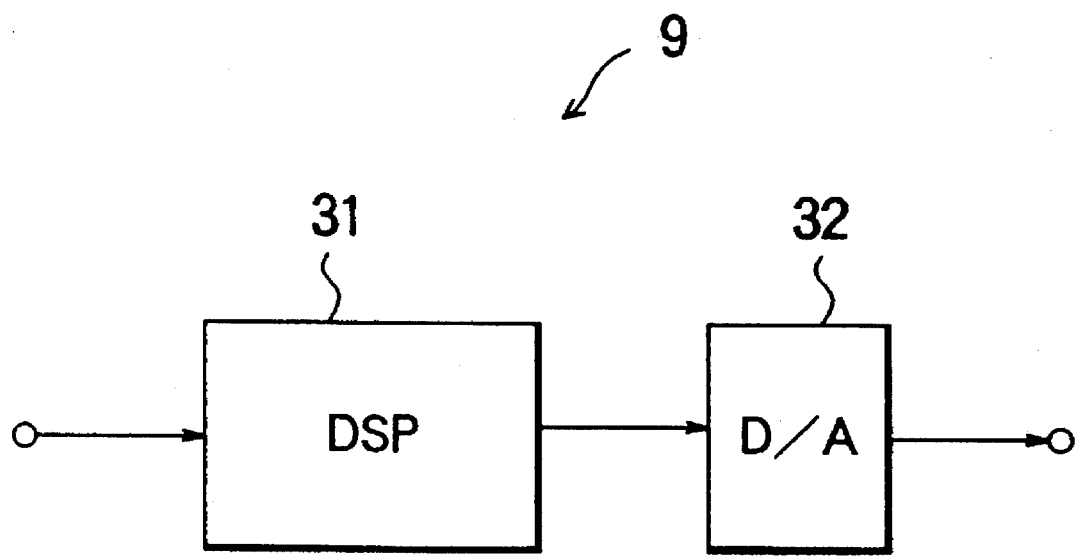
FIG. 6 is a block diagram of a speech decoder of the speech decoding apparatus of FIG. 1.

As illustrated in FIG. 6, the speech decoder 9 comprises a DSP 31 and a digital-to-analog converter (D/A) 32 and reconstructs the analog speech signal from the speech information data to produce the analog speech signal.

In FIG. 1, the measuring circuit 102 comprises a counter 13 which counts the number of the error flags of a high level supplied from the error detector 8. A timer 17 generates periodical pulses in a predetermined time cycle to reset the count. Specifically, the counter 13 counts the number of the error flags in each predetermined time cycle (unit time) and a latch circuit 14 latches the number of the error flags at a time instant of the end of the time cycle.

The comparator 15 compares the number of the error flags thus latched with the reference value preliminarily determined by the reference value setting section 16. When the comparator 15 detects that the number of the error flags thus latched is greater than the reference value, it is judged that the error rate in a period of the radio transmission path is high. In this event, the comparator 15 makes the alarm signal generator 12 generates the alarm signal while the selector 10 is switched.

The alarm signal generator 12 may produce a sine-wave signal (tone signal) having one of audible frequencies, a melody formed by a combination of the sine-wave signals, or a white noise having a pseudo random waveform. When the error rate in the period of the radio transmission path is high, the alarm signal from the alarm signal generator 12 is selected by the selector 10 to reach the ear of the user instead of the decoded speech sound. Thus, the user is not embarrassed because a silent state caused in the conventional system is prevented.

At this time, control may be made so that the decoding operation of the speech decoder 9 is stopped. However, even if the quality of the radio transmission path is deteriorated, a certain level of speech intelligibility still exists in most cases. Under the circumstances, the speech decoder 9 may be kept in an operation state. In that case, the adder 103 (FIG. 3) is used instead of the selector 10 to superpose the reproduction signal from the speech decoder 9 and the alarm signal from the alarm signal generator 12.

Besides the above-mentioned examples, the alarm signal generated by the alarm signal generator 12 may be an alarm voice produced by a speech synthesizing function so that the user does not have an unpleasant feeling.

Furthermore, the periodical pulses generated by the timer 17 may be supplied to the DSP 31 (FIG. 6) so that the DSP 31 directly reads the count of the counter 13 in synchronism with the pulses. With this structure, the channel quality on the radio transmission path is monitored. In dependence upon the quality condition, the white noise is mixed in the decoded speech sound. Thus, the user himself can judge the channel condition in the manner similar to the conventional radio telephone set of a digital system or an analog system.

As described above, according to this invention, detection is made of deterioration of the quality of the radio transmission path. When the level of deterioration becomes great, an alarm sound such as a tone signal or a melody which does not give an unpleasant feeling to the user is generated instead of abrupt interruption of the communication line. Thus, it is possible to notify the user of deterioration of the channel quality.

While this invention has thus far been described in conjunction with an embodiment thereof, it will readily be possible for those skilled in the art to put this invention into practice in various other manners. For example, an error detector 8 of FIG. 1 may have not only an error detection function but also an error correction function in order to deal with another input signal comprising an error detecting and correcting code signal in each block. The error detecting and correcting code signal represents the error detection/correction code described in the preamble of the instant specification.

What is claimed is:

1. A speech decoding apparatus supplied with an input speech signal comprising successive blocks, each comprising a digital speech signal and an error detecting code signal which succeeds said digital speech signal and is for use in detecting an error in said digital speech signal, said speech decoding apparatus decoding the digital speech signals of said successive blocks into an analog speech signal, said speech decoding apparatus comprising:

an error detector supplied with said input speech signal for detecting said error in said digital speech signal by the use of said error detecting code signal for each of said successive blocks to produce error detection pulses whenever said error detector detects said error, said error detector furthermore producing the digital speech signals of said successive blocks;

a speech decoder connected to said error detector for decoding the digital speech signals of said successive blocks into said analog speech signal;

a measuring circuit connected to said error detector for measuring, as a measured value, the number of said error detection pulses during a predetermined time interval;

a comparator connected to said measuring circuit for comparing said measured value with a reference value to produce a command signal representative of said measured value when said measured value is greater than said reference value; and an alarm signal generator connected to said comparator for generating, in response to said command signal, an alarm signal proportional to the measured value represented by said command signal.

2. A speech decoding apparatus as claimed in claim 1, further comprising a selector connected to said speech decoder and said alarm signal generator for selecting said analog speech signal and said alarm signal as an apparatus output signal when said selector is not supplied with said command signal from said comparator and when said selector is supplied with said command signal from said comparator, respectively.

3. A speech decoding apparatus as claimed in claim 1, further comprising an adder connected to said speech decoder and said alarm signal generator for producing said analog speech signal as an apparatus output signal when said adder is not supplied with said alarm signal, said adder producing a sum signal representative of a sum of said analog speech signal and said alarm signal as said apparatus output signal when said adder is supplied with said alarm signal.

4. A speech decoding apparatus as claimed in claim 1, wherein said alarm signal is a sine-wave signal having one of audible frequencies.

5. A speech decoding apparatus as claimed in claim 1, wherein said alarm signal represents a melody formed by a combination of sine-wave signals having audible frequencies.

6. A speech decoding apparatus as claimed in claim 1, wherein said alarm signal represents a white noise having a pseudo random waveform.

7. A speech decoding apparatus as claimed in claim 1, wherein said alarm signal represents a synthesized alarm voice.

8. A speech decoding apparatus supplied with an input speech signal comprising successive blocks, each comprising a digital speech signal and an error detecting and correcting code signal which succeeds said digital speech signal and is for use in detecting and correcting an error in said digital speech signal, said speech decoding apparatus decoding the digital speech signals of said successive blocks into an analog speech signal, said speech decoding apparatus comprising:

error detecting and correcting means supplied with said input speech signal for detecting and correcting said error in said digital speech signal by the use of said error detecting and correcting code signal for each of said successive blocks to produce error detection pulses whenever said error detecting and correcting means detects said error, said error detecting and correcting means furthermore producing corrected digital speech signals of said successive blocks given by correcting said error in said digital speech signal by the use of said error detecting and correcting code signal for each of said successive blocks;

a speech decoder connected to said error detecting and correcting means for decoding the corrected digital speech signals of said successive blocks into said analog speech signal;

a measuring circuit connected to said error detecting and correcting means for measuring, as a measured value, the number of said error detection pulses during a predetermined time interval;

a comparator connected to said measuring circuit for comparing said measured value with a reference value to produce a command signal representative of said measured value when said measured value is greater than said reference value; and an alarm signal generator connected to said comparator for generating, in response to said command signal, an alarm signal proportional to the measured value represented by said command signal.

9. A speech decoding apparatus as claimed in claim 8, further comprising a selector connected to said speech decoder and said alarm signal generator for selecting said analog speech signal and said alarm signal as an apparatus output signal when said selector is not supplied with said command signal from said comparator and when said selector is supplied with said command signal from said comparator, respectively.

10. A speech decoding apparatus as claimed in claim 8, further comprising an adder connected to said speech decoder and said alarm signal generator for producing said analog speech signal as an apparatus output signal when said adder is not supplied with said alarm signal, said adder producing a sum signal representative of a sum of said analog speech signal and said alarm signal as said apparatus output signal when said adder is supplied with said alarm signal.

11. A speech decoding apparatus as claimed in claim 8, wherein said alarm signal is a sine-wave signal having one of audible frequencies.

12. A speech decoding apparatus as claimed in claim 8, wherein said alarm signal represents a melody formed by a combination of sine-wave signals having audible frequencies.

13. A speech decoding apparatus as claimed in claim 8, wherein said alarm signal represents a white noise having a pseudo random waveform.

14. A speech decoding apparatus as claimed in claim 8, wherein said alarm signal represents a synthesized alarm voice.

* * * * *